United States Patent Office 3,326,921
Patented June 20, 1967

3,326,921
SUBSTITUTED INDOLIZINE OXIMES
Robert J. Stanaback, Morristown, Richard E. Brown, Hanover, and Robert I. Meltzer, Rockaway, N.J., assignors to Warner-Lambert Pharmaceutical Company, Morris Plains, N.J., a corporation of Delaware
No Drawing. Filed Apr. 27, 1965, Ser. No. 451,308
4 Claims. (Cl. 260—286)

This invention relates to novel substituted indolizines and more particularly, it relates to indolizines of the formula:

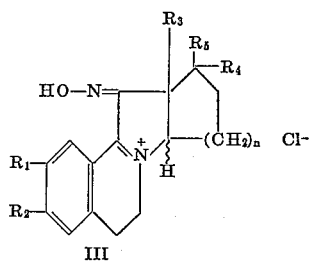

III and

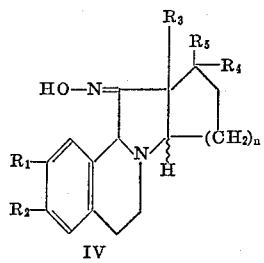

IV wherein $R_1$ and $R_2$ each represents hydrogen, hydroxy, or lower alkoxy such as methoxy or methylene dioxy; $R_3$ represents hydrogen or lower alkyl of 1 to 6 carbon atoms such as methyl, ethyl and the like; $R_4$ represents hydrogen, hydroxy or $OR_6$ in which $R_6$ is an acyl radical of from 1 to 6 carbon atoms; $R_5$ represents hydrogen, lower alkyl of 1 to 6 carbon atoms, alkenyl such as vinyl, allyl and acyl such as acetyl, formyl or propionyl,

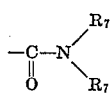

or

wherein $R_7$ is hydrogen or lower alkyl of 1 to 6 carbon atoms; or $R_4$ and $R_5$ taken together with the carbon atom to which they are attached represent a keto or cyclic ketal group such as

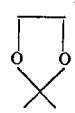

and $n$ is an integer of from 1 to 2.

The symbols $R_1$, $R_2$, $R_3$, $R_4$, $R_5$ and $n$ as used hereinafter have the same meaning as defined.

This invention also encompasses within its scope a novel process for the production of the above compounds as well as intermediates useful for their production.

The compounds of this invention exhibit interesting steroidal activities and are therefore useful in endocrine therapy. They also exhibit significant pharmacological activity on the cardiovascular system as well as anti-inflammatory activity. In use they are combined with a pharmaceutical carrier to form dosage forms such as tablets, suppositories, solutions, elixirs, capsules and the like. They may also be combined with other therapeutic agents such as tranquilizers, antibiotics, analgesics and cardiovascular agents to enhance their therapeutic spectrum. In addition, they are useful as intermediates for the production of other substituted indolizines as 11-amino substituted indolizines.

The numbering of the compounds of this invention when $n$ is 2 is as follows:

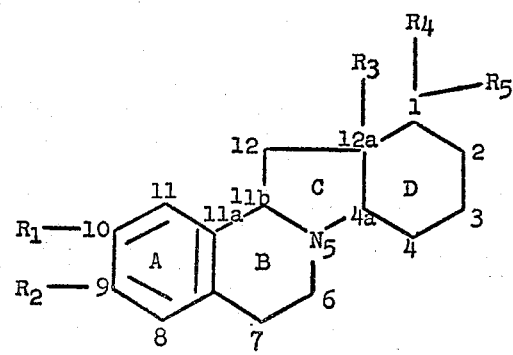

and when $n$ is 1 the numbering is as follows:

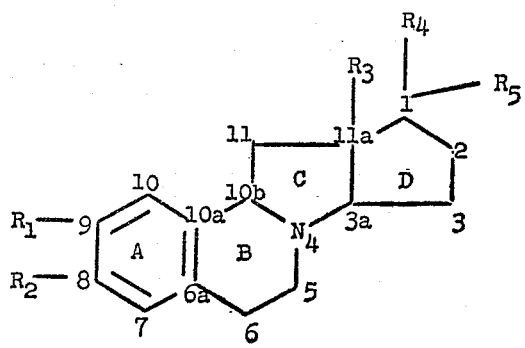

According to the process of this invention, the novel compounds of this invention are prepared by reacting an indolizine of the formula:

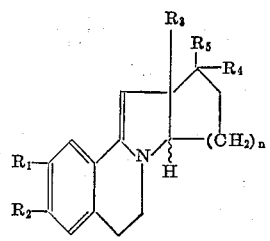

with nitrosyl chloride to give an intermediate of the formula:

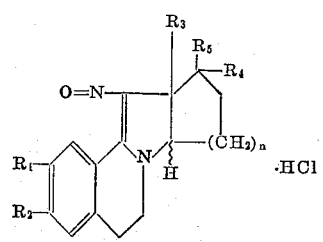

II

The above intermediate II undergoes rapid tautomerization in hydroxylic solvents such as water or low molecular weight alcohols such as methanol to form the oxime of the Formula III:

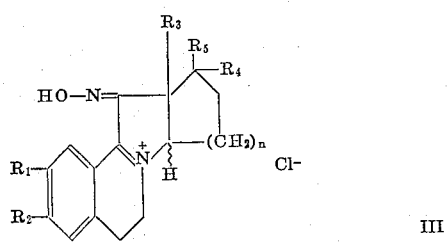

III

The starting indolizines used in this reaction are prepared in accordance with the process set forth in application Ser. No. 357,275 filed Apr. 3, 1964.

The nitrosation reactions of this invention above-described are best carried out at low temperatures in inert solvents. A temperature range of from 30° C. down to —120° C. will suffice, however, the preferable temperature range is —50° C. to —78° C. Inert solvents useful in this reaction are ether, benzene, toluene, dichloromethane and the like.

The reaction is most conveniently carried out by adding slowly a solution of one molar equivalent of nitrosyl chloride dissolved in the inert solvent to a rapidly stirring solution of the indolizine base in a suitable inert solvent and at the proper temperature. Under such conditions there is formed an immediate precipitate of adduct II, which can in some cases be removed by simple filtration. In other cases, the initial adduct is obtained in a form unsuitable for filtration. In such cases, the reaction product is best isolated by extraction with water, whereby the material is obtained in form III.

Finally, compounds of the type III may in turn be reduced to give saturated indolizines of type IV:

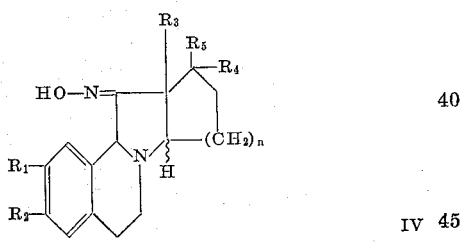

IV

Such reduction reactions are best carried out through the use of a complex alkali metal borohydride such as sodium or potassium borohydride.

The following examples are included in order further to illustrate the invention.

*Example 1.—Trans - 1,2,3,3a,5,6,11,11a - octahydro - 8-methoxy-11-keto-benzo[g] - cyclopenta[b]indolizinium chloride oxime*

A solution of 1.7 g. of trans-2,3,3a,5,6,11a-hexahydro-8 - methoxy - 1H-benzo[g]cyclopenta[b]indolizine in 200 ml. of anhydrous ether is cooled to —78° C. and treated dropwise with stirring with a solution of 0.05 g. of nitrosyl chloride in ether. The resulting yellow suspension is warmed to 20° C. with stirring and filtered. The product is recrystallized from ethanol to give trans-1,2,3,3a,5,6,11,11a-octahydro - 8 - methoxy - 11 - keto-benzo[g]cyclopenta[b]indolizinium chloride oxime as yellow crystals, M.P. 204–6° C.

*Example 2.—Trans - 2,3,3a,5,6,10b,11,11a - octahydro-8-methoxy - 1H - benzo[g] - cyclopenta[b]indolizine-11-one oxime*

A solution of 1.5 g. of 1,2,3,3a,5,6,11,11a-octahydro-8-methoxy - 11 - keto - benzo[g]cyclopenta[b]indolizinium chloride oxime in 50 ml. of ethanol is treated with 1.0 g. of sodium borohydride in small portions over a period of 1 hour. The mixture is filtered, concentrated to dryness and partitioned between water and ether. The ether phase is dried over magnesium sulfate and the ether removed to give trans - 2,3,3a,5,6,10b,11,11a - octahydro-8-methoxy - 1H - benzo[g]cyclopenta[b]indolizine-11-one oxime as white crystals, which after recrystallization from acetonitrile melts at 190–191° C.

It is understood that the foregoing detailed description is given merely by way of illustration and that many variations may be made therein without departing from the spirit of our invention.

Having described our invention, what we desire to secure by Letters Patent is:

1. A member of the group consisting of compounds of the formula:

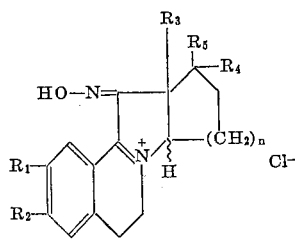

and

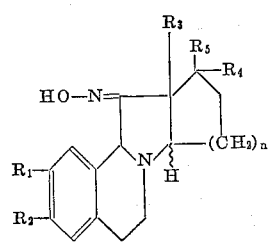

wherein $R_1$ and $R_2$ each is a member selected from the group consisting of hydrogen, hydroxy and methylene dioxy, lower alkoxy; $R_3$ is a member selected from the group consisting of hydrogen, methyl and ethyl; $R_4$ and $R_5$ are each hydrogen and $R_4$ and $R_5$ taken together with the carbon atoms to which they are attached form a member of the group consisting of keto and cyclic ketal and $n$ is an integer of from 1 to 2.

2. Trans-1,2,3,3a,5,6,11,11a - octahydro-8-methoxy-11-keto-benzo[g]cyclopenta[b]indolizinium chloride oxime.

3. Trans-2,3,3a,5,6,10b,11,11a - octahydro-8-methoxy-1H-benzo[g]cyclopenta[b]indolizine-11-one oxime.

4. A compound of the formula:

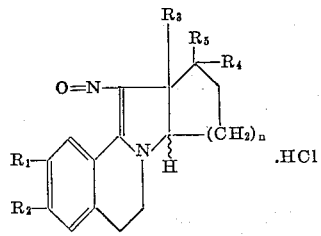

wherein $R_1$ and $R_2$ each is a member selected from the group consisting of hydrogen, hydroxy and lower alkoxy; $R_3$ is a member selected from the group consisting of hydrogen, methyl and ethyl; $R_4$ and $R_5$ are each hydrogen and $R_4$ and $R_5$ taken together with the carbon atoms to which they are attached form a member of the group consisting of keto and cyclic ketal and $n$ is an integer of from 1 to 2.

References Cited

Kanaoka: Chem. Pharm. Bull., vol. 7, pages 595–7 (1959).

ALEX MAZEL, *Primary Examiner.*

D. G. DAUS, *Assistant Examiner.*